United States Patent

Crovatt, Jr. et al.

[15] 3,666,731
[45] May 30, 1972

[54] POLYAMIDE FILAMENTS CONTAINING HIGH VISCOSITY ANTISTATIC AGENTS

[72] Inventors: Lawrence W. Crovatt, Jr., Gulf Breeze; Ullman C. Garrett, Jr., Pensacola, both of Fla.

[73] Assignee: Monsanto Company, St. Louis, Mo.

[22] Filed: Aug. 13, 1970

[21] Appl. No.: 63,662

[52] U.S. Cl. .......................260/78 S, 260/18 N, 260/47 ED, 260/78 A, 260/78 L, 260/830 P, 260/857 R, 260/857 PG
[51] Int. Cl. .......................................................C08g 20/38
[58] Field of Search ...................260/78 R, 78 S, 78 A, 78 L, 260/18 N, 47 EP, 830 P, 857 PE

[56] References Cited

UNITED STATES PATENTS 3,226,178  12/1965  Walker .........................................8/165

3,388,104  6/1968  Crovatt .................................260/78 S

Primary Examiner—Harold D. Anderson
Attorney—Stanley M. Tarter, John W. Whisler and Elmer J. Fischer

[57] ABSTRACT

Static-resistant polyamide fibers are produced by dispersing from 0.1 to 20 percent by weight of a modified polyalkoxylated hydrogenated castor oil (castor wax) into the polyamide melt prior to filament formation. The modified castor wax is the addition product of castor wax and a diepoxide compound having two ethoxyline groups (i.e. $CH_2 \overset{O}{-\!\!\!-\!\!\!-} CH-$) as terminal groups. The modified castor wax has a higher melt viscosity than the corresponding unmodified castor wax which enables better dispersion thereof in the polyamide melt. As a result, polyamide fibers containing the modified castor wax are more easily processed and are of higher quality.

7 Claims, No Drawings

POLYAMIDE FILAMENTS CONTAINING HIGH VISCOSITY ANTISTATIC AGENTS

BACKGROUND OF THE INVENTION

Polyamide fibers containing castor wax are described in U.S. Pat. No. 3,388,104, issued June 11, 1968 to L. W. Crovatt, Jr.

Castor wax is easily prepared, by reacting hydrogenated castor oil with the appropriate number or moles of alkylene oxide per mole of oil. However, since slow reaction rates and prolonged heating times are encountered in attempting to add more than about 250 moles of alkylene oxide onto the hydrogenated castor oil molecule, high alkylene oxide-containing castor waxes are costly and are of inferior quality. One disadvantage in using castor wax having less than about 250 moles of alkylene oxide in its molecule to produce static-resistant polyamide fibers by melt spinning processes is that this castor wax does not have a sufficiently high melt viscosity to disperse uniformly in the polyamide melt.

Non-uniform dispersion of castor wax in the polyamide melt results in poor processability of the filaments (e.g. filaments discontinuities are encountered) and in filaments of reduced quality (e.g. the filaments are of non-uniform cross-section and the antistatic property thereof is reduced).

An object of the invention is to provide castor wax-containing polyamide filaments of improved quality.

SUMMARY OF THE INVENTION

The above-mentioned objects of the invention are accomplished by providing a modified castor wax which is the addition product of a poly-alkoxylated hydrogenated castor oil (castor wax) of the formula:

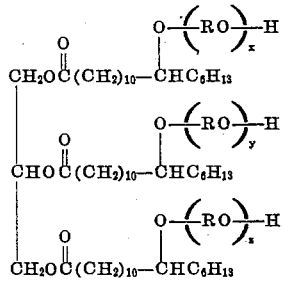

wherein $x + y + z$ is between 50 and about 250 and R is a $C_2$ to $C_4$ alkylene radical, and a compound containing carbon, hydrogen and oxygen atoms and having two ethoxyline groups

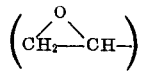

as terminal groups and a molecular weight between 86 and about 10,000.

The modified castor wax has a higher melt viscosity than the corresponding unmodified castor wax. By virtue of its higher melt viscosity, the modified castor wax disperses more uniformly into polyamide melts. The resulting melt blends are readily processed into high quality static-resistant fibers.

The compounds reacted with castor wax to prepare the modified castor wax are hereinafter referred to as diepoxides. Diepoxides which may be reacted with castor wax to produce the modified castor wax of the invention are:

1. butadiene dioxide having the formula

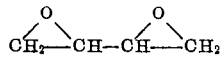

2. diglycidyl ether having the formula

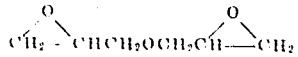

3. diglycidyl ethers of:
   a. mononuclear and polynuclear dihydroxy phenols;
   b. diols; and
   c. poly(alkylene ethers), wherein the alkylene radicals has from two to four carbon atoms.

These diglycidyl ethers may be represented by the formula:

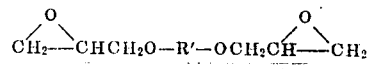

wherein R' is the hydrocarbon residue of a diol or a diphenol or the radical

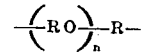

wherein R is a $C_2$ to $C_4$ alkylene radical and n is an integer from 1 to about 350.

4. poly(diglycidyl ethers) of the compounds described under paragraph 3 which may be represented by the formula

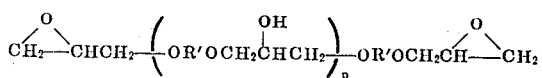

wherein R' is as defined above and p is an integer from 1 to 50.

Preparation of diepoxides of the type just mentioned is described in the book entitled "Epoxy Resins" by Lee and Neville published by the McGraw-Hill Book Company, N.Y. (1957). Phenols which may be used to prepare the diglycidyl ethers include:

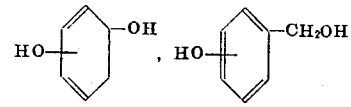

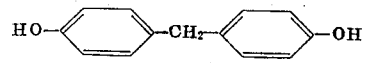

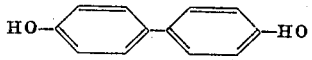

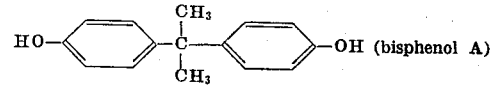 (bisphenol A)

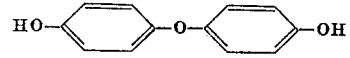

and

where $n$ and $m$ are integers from 1 to 10. Diols which may be used to prepare the diglycidyl ethers include: ethylene diol, 2,3-butanediol, 1,6-hexanediol, etc. (e.g. alkylene and alkane diols having two to 12 carbon atoms. Poly(alkylene ethers) which may be used to prepare the diglycidyl ethers include: polyethylene glycols, polypropylene glycols and copolymers thereof, wherein the poly(alkylene ethers) have a molecular weight between about 106 and 10,000. The diglycidyl ether of bisphenol A is a preferred diepoxide for use in carrying out the invention since it is inexpensive and commercially available.

The amount of diepoxide reacted with the castor wax may vary over a wide range depending upon the molecular weights thereof and the melt viscosity desired for the modified castor wax. In general, a mole ratio within the range of from 2:3 to 5:1, castor wax to diepoxide, may be employed. Good results are attained, for example, by reacting castor wax containing 200 moles of ethylene oxide per mole of wax with from 3 to 10 grams of Epon 828 per 100 grams of the castor wax.

The reaction occurring between the diepoxide and castor wax molecules is one of addition in which epoxy groups react with hydroxy groups to form

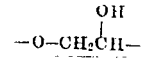

The invention provides an economical method for increasing the melt viscosity of castor waxes without sacrificing the quality or characteristics thereof, thereby enabling easy and uniform dispersion thereof into polyamide melts. The polyamide melts can then be readily melt-spun into high quality static-resistant filaments.

PREFERRED EMBODIMENTS OF THE INVENTION

The following examples are given to further illustrate the invention. In the examples "200 EO castor wax" refers to the compound of formula I when $x + y + z = 200$.

EXAMPLE I

Two products, indicated as A and B in Table 1, were prepared by reacting 200 EO castor wax containing 0.01 milliequivalents/gram of KOH catalyst with (a) 3.27 grams of a diglycidyl ether of bis(4-hydroxyphenyl)-dimethylmethane per 100 grams of 200 EO castor wax (product A) and with (b) 4.42 grams of the diglycidyl ether per 100 grams of 200 EO castor wax (product B). The reactions were carried out in stirred reaction vessels under an inert gas blanket at 130° C. for 3 hours. The products after cooling to 95° C. were neutralized using an aqueous 85% phosphoric acid solution. Each of the products were then filtered to remove insoluble potassium phosphate salts. The melt viscosity of the products and of 200 EO castor wax is shown in Table 1.

TABLE 1

|  | Grams per 100 Grams of 200 EO Castor wax | Melt Viscosity at 100°C.[1] |
| --- | --- | --- |
| 200 EO Castor wax | 0 | 310 cps[2] |
| Product A | 3.27 | 680 cps |
| Product B | 4.42 | 1125 cps |

[1] Brookfield LVF Viscometer, No. 2 spindle at 30 rpm.
[2] cps = centipoises

EXAMPLE II

This example illustrates the preparation of polyhexamethylene adipamide (nylon 66) filaments containing 7.5 percent by weight of 200 EO castor wax having a melt viscosity of 310 cps.

Nylon 66 flake is fed into an extruder and 7.5 percent by weight of 200 EO castor wax was injected into the melt section of the extruder immediately prior to a mix section thereof. The resulting mixture was then spun into filaments. Poor wax dispersion was indicated by poor spinning performance due to excessive filament discontinuities or "drips." In addition, the cross-section of some of the filaments were different from the cross-section of other of the filaments, i.e., the filament-to-filament cross-section was not uniform.

EXAMPLE III

The procedure of Example II was repeated with the exception that instead of using 200 EO castor wax 7.5 percent by weight of product A of Example I was used. In this instance the wax dispersion was markedly improved as evidenced by improved spinning performance and lack of filament discontinuities or "drips." Also, the uniformity of the filament-to-filament cross-section was markedly improved.

EXAMPLE IV

The yarns of Examples II and III were each laundered in a conventional electric washing (Sears) machine with commercially available detergent (Tide). After laundering the percent wax retained in each yarn was determined by extracting the remaining wax and comparing this amount to the amount present before laundering (7.5 percent by weight). The wax retained in the yarn of Example II, which contained 7.5 percent by weight 200 EO castor wax, was 60 percent, whereas the wax retained in the yarn of Example III, which contained 7.5 percent by weight of product A, was 78 percent.

The results in the examples show that the castor wax/diepoxide reaction products described herein are easily dispersed in nylon melt to provide a mixture that is capable of being melt spun into high quality filaments.

The castor wax/diepoxide reaction products may be incorporated into any polycarbonamide. The polycarbonamides are well known in the art and are generally prepared by heating either (2) substantially equimolecular proportions of a diamine and a dicarboxylic acid or (b) various amino acids or the amide-forming derivatives thereof (e.g. lactams) until the material has polymerized to the fiber-forming stage. The diamines are generally of the formula $NH_2(CH_2)_nNH_2$, wherein n is at least 2 and preferably 4 to 12; the dicarboxylic acids are generally of the formula $HOOC-R^2-COOH$, wherein $R^2$ is a divalent hydrocarbon radical having a chain length of at least two carbon atoms and preferably four to 10 carbon atoms; the amino acids are generally of the formula $NH_2(CH_2)BnCOOH$, wherein n is 3 to 11 and the amide-forming derivatives thereof commonly employed are the lactams of the formula

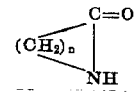

Representative polycarbonamides include polyhexamethylene adipamide, polyhexamethylene sebacamide, polycaprolactam, etc. Polycarbonamides of the foregoing description are characterized in containing recurring carbonamide linkages

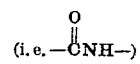

separated from one another by at least two carbon atoms. The invention has been described with reference to castor wax prepared by reacting hydrogenated castor oil with a molar excess (50:1 to 250:1) of ethylene oxide. Ethylene oxide is preferred due to the better performance and commercial availability thereof. However, other $C_2$ to $C_4$ alkylene oxides can also be used to prepare the castor wax, such as propylene oxide or butylene oxide or mixtures of the $C_2$ to $C_4$ alkylene oxides.

We claim

1. A polycarbonamide static-resistant filament containing from 2 to 15 percent by weight of the addition product obtained by reacting a polyalkoxylated hydrogenated castor oil of the formula:

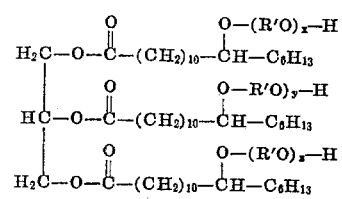

wherein R' is a $C_2$ to $C_4$ alkylene radical and x, y and z are integers, the sum of which is between 50 and about 250, and a compound selected from the group consisting of butadiene dioxide, diglycidyl ether and diglycidyl ethers of the formula

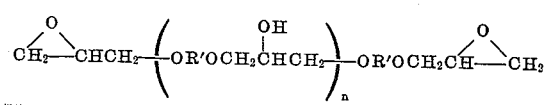

where R' is the hydrocarbon residue of a diol or diphenol and n is zero or an integer from 1 to 50, in a mole ratio of from 2:3 to 5:1, said castor oil to said compound, wherein the reaction occurring between said castor oil and said compound is an addition reaction in which hydroxy groups of said castor oil react with $\overset{O}{\underset{CH_2-CH-}{\triangle}}$ groups of said compound to form $\underset{-OCH_2CH-}{\overset{OH}{|}}$ linkages.

2. The filament of claim 1 wherein said compound is the diglycidyl ether of bis(4-hydroxyphenyl) dimethylmethane.

3. The filament of claim 1 wherein said compound is butadiene dioxide.

4. The filament of claim 1 wherein said compound is the diglycidyl ether of polyethylene glycol in which the glycol has a molecular weight between about 150 and about 10,000.

5. The filament of claim 2 wherein the polycarbonamide is polyhexamethylene adipamide.

6. The filament of claim 3 wherein the polycarbonamide is polyhexamethylene adipamide.

7. The filament of claim 4 wherein the polycarbonamide is polyhexamethylene adipamide.

* * * * *